Oct. 2, 1945.    H. A. TAYLOR    2,385,893
STRUCTURAL CONNECTOR
Filed Nov. 13, 1943

Inventor.
Henry A. Taylor
By his attorney
John H. McKenna

Patented Oct. 2, 1945

2,385,893

UNITED STATES PATENT OFFICE 2,385,893

STRUCTURAL CONNECTOR

Henry A. Taylor, Dorchester, Mass.

Application November 13, 1943, Serial No. 510,085

12 Claims. (Cl. 151—33)

This invention relates to improvements in connectors of the bolt and nut general class and more particularly to such connectors which have provision for preliminary mounting of a nut at one side of a structural element in position to receive the threaded end of a bolt or screw inserted and driven through the structural element from the opposite side.

The various prior art proposals for mounting a nut non-rotatably in register with a hole through which a bolt can be threadedly engaged with the nut have been unsatisfactory for one reason or another. Some of them involve an impracticable amount of labor and expense to manufacture and install the nut retainers. Others are ineffective for accurately locating the nuts. Still others lack provision for ensuring maintenance of the required tight clamping together of the elements secured by the connector.

When it is considered that a principal use of such connectors is in structural work where the bolts or screws extend through one or more relatively large sheet elements for securing the sheets together, or extend through some object of equipment and a wall on which the object is to be mounted, the importance of accurate location of the nuts relative to the bolt holes is obvious because the nuts necessarily are at locations not readily accessible to the workman inserting and driving the bolts from the opposite side of the structural sheets or wall. Hence an inaccurately placed nut cannot be adjusted in the absence of a man on the nut side of the structure, and oftentimes a nut once wrongly placed is not easily shifted to correct its alignment. The majority of heretofore available nut retainers are non-removably mounted and great difficulty and inconvenience is involved to change an initial setting of a nut.

Another important use for connectors of this general type is for stepping up production where a multiplicity of bolt and nut fastenings are to be made relatively close together, as in ship and plane constructions. In such cases all of the nuts may be preliminarily mounted in register with their respective bolt holes and then a workman moving from one to another quickly can drive home the bolts without fussing with the individual nuts. However if time is to be saved in this latter situation, the initial mounting of the nuts must be possible of attainment quickly and effectively, a result not adequately served by the prior nut retainers.

Also, there must be assurance that a tight connection once made will continue tight notwithstanding vibrations and reasonable expansions and contractions of materials due to temperature changes. In other words, effective locking means restraining relative rotation of the nut and bolt is essential.

It is an object of my present invention to provide a bolt and nut connector which more effectively and efficiently can serve the desirable and essential requirements above mentioned as compared with prior connectors of which I have knowledge. I provide a nut retainer having provision for non-rotatably receiving a nut therein and having projecting means at the bearing end of the nut for frictionally and non-rotatably engaging in precisely located slots in the structural element on which the nut is to be mounted. A feature is that the retainer with a nut therein may be securely affixed to the structural element as a result of a mere thrust of the retainer toward the element, with the retainer projections entering and frictionally gripping the element to hold the retainer and nut accurately and non-rotatably registering with a bolt hole; and the retainer may be removed, if desired, by a pull sufficient to overcome the frictional grip of said projections on the walls of said slots.

Another object is to provide for a locking interengagement between the nut and the threads of the bolt. To this end the retainer resiliently grips the sides of the nut and initially holds the bearing surface of the nut spaced from the face of the structural element, so that the bolt is made to draw the nut toward the structural element and to overcome the said resilient grip of the retainer on the nut in doing it. Hence a locking frictional engagement between the nut and bolt threads is produced prior to engagement of the nut with the structural element, and this is further increased by the ultimate tightening of the bolt with the nut in bearing contact with the structural element.

Still another object is to provide a nut retainer structure which can be stamped from sheet metal stock inexpensively and efficiently on principles of mass production, and which can be shaped and sized to fit different shapes and sizes of nuts.

It is, moreover, my purpose and object generally to improve the structure and effectiveness of connectors of the class to which the invention relates.

Figure 1:
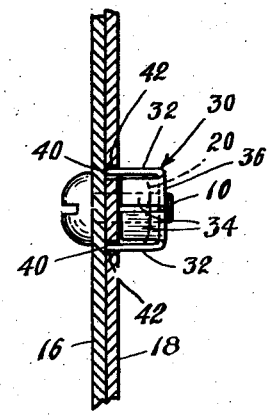
Figure 1 is a vertical cross-sectional view showing two structural sheet elements secured together by a connector embodying features of my present invention, the section being at a location corresponding to line 1—1 of Figure 5.
Figure 2:
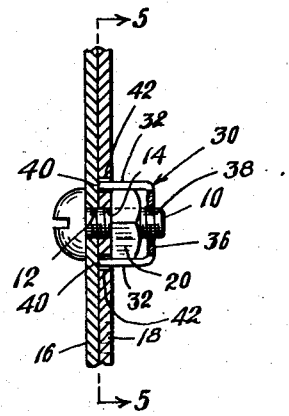
Figure 2 is a similar view in section at a location corresponding to line 2—2 of Figure 5, but showing the bolt and nut in elevation.

Referring to the drawing, a bolt or screw 10 is shown in Figs. 1–3 and 5 extending from one side through the registering holes 12, 14 in the structural sheet elements 16, 18 and threadedly engaging a nut 20 on the other side for clamping the two sheet elements together. So far as my invention is concerned, the particular elements to be secured together by the bolt and nut connector might be any of a large variety of structural parts, or the securement may be of some article of equipment, structural reinforcement or ornamentation on a wall, or the like, as suggested in Fig. 6 of the drawing where the bolt 22 is longer than bolt 10 and, with nut 24, secures the object 26 on the relatively thick wall 28.

The invention relates more particularly to a novel nut locator and retainer for preliminarily mounting a nut in correct non-rotatable registration with a hole through which a bolt is to be inserted and driven into threaded engagement with the nut. Ordinarily such a nut retainer will be used in structures and under conditions where the nut is required to be placed at a location inaccessible or difficultly accessible to the workman inserting and driving the bolt or screw. For example, in sheet metal structural work, a workman at the front side of the structure ordinarily cannot reach around or through to the rear side of the structure to place and hold a nut while a bolt is engaged and driven from the front side. Either there must be a man at each side, one for placing and holding the nut and the other for inserting and driving the bolt, or the nut preliminarily must be mounted on the rear side. However, even though both sides of a structure are conveniently within the reach of a single workman, considerable time can be saved in effecting a multiplicity of bolt and nut connections by preliminarily mounting all or a considerable number of the nuts in readiness to receive the threaded ends of their respective bolts as the workman moves from one to another of the connector locations at the front side of the structure. In such a case one man may mount the nuts and another follow inserting and driving the bolts or screws, or a single workman may first mount the nuts and then insert and drive the bolts in succession without need for fussing with the individual nut at each connection.

Figure 4:
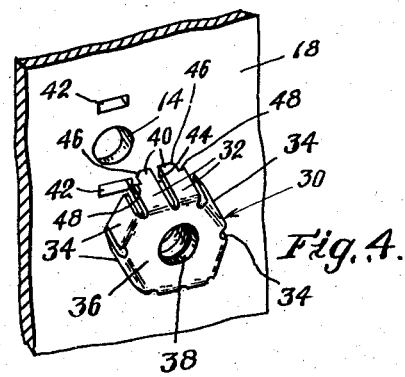
Figure 4 is a perspective view showing the nut retainer disengaged from the locating and retaining slots in the structural element.
Figure 5:
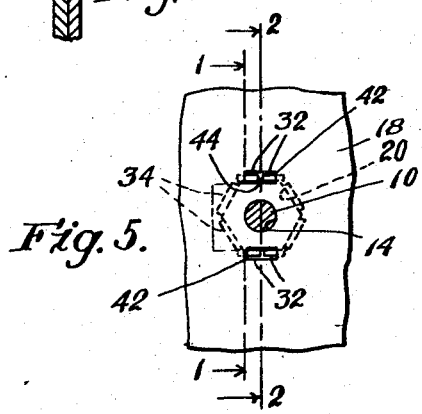
Figure 5 is a cross-sectional view on line 5—5 of Figure 2.
Figure 6:
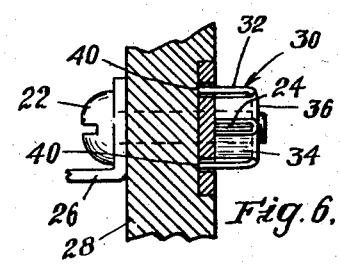
Figure 6 is a view similar to Figure 1 but showing my connector applied to a relatively thick wall, for securing an object on the wall.

According to my invention the nut retainer, indicated generally at 30, conveniently and economically may be stamped from sheet metal in accordance with well known procedure for mass production. As shown, it is generally cup-shaped with slitted side walls 32, 34 and a bottom wall 36 through which latter the centrally disposed hole 38 extends for receiving loosely the threaded end of a bolt 10 or 22. The retainer 30 preferably will have cross-sectional shape transversely of the axis corresponding generally with the similar cross-sectional shape of the nut to be retained. In the drawing, a hexagonal nut is illustrated and the retainer 30 has generally hexagonal shape for receiving the nut, as best seen in Fig. 5 and in the perspective view of Fig. 4.

It is a feature of the present structure that the side walls 32, 34 of the retainer cup are adapted to resiliently embrace the flat sides of a nut pressed into the cup, so that axial movement of the nut in the cup requires a force capable of overcoming a substantial friction between the nut and the walls 32, 34. This is important in connection with the locking feature of the device, later to be described.

The oppositely disposed walls 32 of the retainer have extent from the bottom wall 36 substantially greater than the oppositely disposed walls 34 to provide terminal projecting parts 40 on the walls 32 for engaging in slots 42 in the structural element 18. These terminal parts 40 are longitudinally slitted with slight removal of metal, as at 44, and their outer terminal edges are rounded as at 46 to constitute cam surfaces for riding on the end walls of the slots 42 when the retainer is thrust axially toward element 18. The breadth of the slitted terminals slightly exceeds the length of the slots 42, so that the portions of the terminal parts 40 on opposite sides of a slit are cammed edgewise toward each other with slight closing of the slit when the terminal parts 40 are forced into the slots 42. The resiliency of the pinched together terminal portions produces friction between the terminal parts 40 and the end walls of slots 42 sufficient to hold the retainer strongly in attached relation to element 18. Shoulders 48 on the terminal parts 40 limit the extent to which the terminals may enter slots 42 and maintain the shorter walls 34 out of contact with element 18.

Figure 3:
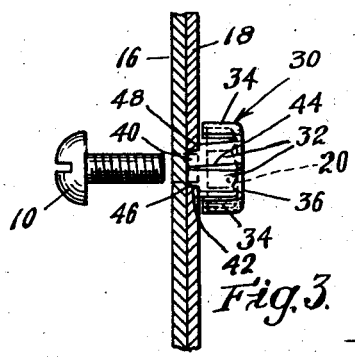
Figure 3 is a view similar to Figure 1 showing the bolt prior to its insertion and engagement with the nut and the nut dotted in its initial spaced relation to the structural element.

As indicated by the dotted showing in Fig. 3, a nut to be mounted is first pressed into retainer 30 preferably until its inner end engages the bottom wall 36. In this position of the nut, its bearing face will be spaced somewhat inward from the limiting shoulders 48 on the terminal parts 40. Hence, when the retainer is thrust toward element 18 to engage terminal parts 40 in the slots 42, the shoulders 48 engage element 18 to limit further movement and the bearing face of the nut is spaced from element 18 as indicated in Fig. 3. Bolt 10 or 22 now may be inserted and driven into threaded engagement with the nut while the latter continues in spaced relation to element 18. But when the bolt reaches its innermost position with its head engaging element 16, further turning of the bolt tends to draw the nut axially toward element 18 and gradually does draw the nut in that direction until it ultimately engages element 18. However, the frictional resistance to movement of the nut within retainer 30 produces a heavy friction between the bolt threads and the nut which tends to lock them against unintentional relative rotation. The ultimate drawing of the nut tight against element 18 further enhances this locking tendency.

The slots 42 in the structural element 18 necessarily must be precisely located relative to the associated bolt hole 14 and must be properly sized relative to the terminal portions 40 of the nut retainer 30. Preferably the bolt hole 14 and the two slots 42 in element 18 for each connector will be made simultaneously by suitable dies of a press or the like, ensuring accuracy of relative locations and sizing and ensuring also that the bolt hole and slots at each connector location will be the same.

Although I have illustrated a nut retainer 30 having wall portions engaging each flat side of a nut, the walls 34 may be dispensed with, if desired, and reliance placed entirely on walls 32 for providing frictional resistance to movement of the nut in the retainer. I prefer the structure as shown, however, because the nut is more securely held against tilting, possibility of any misalignment, and a stronger locking friction is attainable.

I claim as my invention:

1. A structural assembly comprising a structural element and a member in predetermined secured relation thereto, a bolt extending from one side of the structure through said member and element, a nut at the other side of the structure threaded on the bolt and engaging said element, and means mounting the nut on said other side of the structure independently of said bolt including projections thrust axially of the bolt retaining said nut by frictional gripping engagement between only surfaces having extent generally in direction parallel with the axis of the bolt.

2. A mounted nut comprising a support having a hole therethrough, a nut axially aligned with said hole, and means frictionally embracing the nut having projections extending in axial direction beyond the bearing end of the nut and frictionally engaging only surfaces of the support having extent generally in direction parallel with the axis of the hole, said frictional engagement of the projections with the support providing gripping force only generally transversely of the axis maintaining said nut-embracing means on the support with the nut and hole in their said alignment.

3. A mounted nut comprising a support having a hole therethrough, a nut axially aligned with said hole, and a nut retainer frictionally embracing the nut and maintaining it on the support in its said axial alignment with the hole, said retainer comprising oppositely disposed arms extending generally parallel with the nut axis between which the nut is frictionally engaged, terminal portions of said arms extending beyond the bearing end of the nut, there being sockets in the support in predetermined relation to said hole having surfaces extending in general parallelism with the axis of the nut, and said terminals frictionally gripping only said axially extending surfaces of the sockets to retain the nut on the support.

4. In a structural assembly including two structural elements, means securing said elements in predetermined fixed relation comprising a bolt extending from one side of the structure through both structural elements, a nut at the other side of the structure threaded on the bolt and coacting with the bolt to clamp the two structural elements in the said predetermined relation, and means at the nut side of the structure embracing the nut and thrust axially into frictional gripping engagement with the structure for mounting the nut thereon independently of said bolt, there being projections on the latter said means and coacting sockets in said structure providing for the said independent mounting of the nut by axial thrust, and said frictional gripping engagement being only between surfaces of said projections and said sockets which have extent generally in direction parallel with the axis of the nut.

5. In a structural assembly including two structural elements, means securing said elements in predetermined fixed relation comprising a bolt extending from one side of the structure through both structural elements, a nut at the other side of the structure threaded on the bolt and coacting with the bolt to clamp the two structural elements in the said predetermined relation, and a nut retainer having oppositely disposed generally parallel arms resiliently embracing opposite sides of the nut and having terminal parts projecting beyond the bearing end of the nut, said terminal parts being each resiliently compressible edgewise thereof, and there being receiving sockets in the adjacent structural element for compressing the terminals edgewise when the terminals are thrust axially into the sockets, whereby frictional grip between the edges of the terminals and walls of the sockets maintains the retainer and its nut on the structural element independently of said bolt.

6. A mounted nut comprising a support having a bolt hole therein and a plurality of other holes in predetermined relation to the bolt hole, a nut axially aligned with the bolt hole in the support having projections thrust axially into said other holes in the support and maintained only by frictional gripping between axially extending surfaces of the projections and axially extending walls of said other holes.

7. A nut retainer for mounting a nut on a support with its axis aligned with a bolt hole in the support, said retainer having a part overlying an end of the nut, and nut-embracing arms extending from said overlying part in general parallelism to the nut axis and at each side of the nut, said arms having projections extending beyond the end of the nut which is remote from said overlying part of the retainer, and each projection having a split terminal for frictionally gripping a socket wall when the terminals are thrust axially into receiving sockets of the support.

8. A nut retainer for mounting a nut on a support with its axis aligned with a bolt hole in the support, said retainer being generally cup-shaped for receiving a nut therein and having its side walls slitted to provide wall sections for resiliently embracing flats of the nut, oppositely disposed ones of the wall sections projecting beyond the bearing end of the nut and each said projection having provision for frictionally engaging in a socket in a support when the retainer is thrust axially toward the support.

9. A nut retainer for mounting a nut on a support with its axis aligned with a bolt hole in the support, said retainer being generally cup-shaped for receiving a nut therein and having its side walls slitted to provide wall sections for resiliently embracing flats of the nut, oppositely disposed ones of the wall sections projecting beyond the bearing end of the nut and each said projection having provision for frictionally engaging in a socket in a support when the retainer is thrust axially toward the support, and means on each projection for stopping movement of the projection axially into the socket prior to engagement of the bearing end of the nut with the support.

10. A nut retainer for mounting a nut on a support with its axis aligned with a bolt hole in the support, said retainer being generally cup-shaped for receiving a nut therein and having its side walls slitted to provide wall sections for resiliently embracing flats of the nut, oppositely disposed ones of the wall sections projecting beyond the bearing end of the nut and each said projection having provision for frictionally engaging in a socket in a support when the retainer is thrust axially toward the support, and shoulders on each projection for stopping movement of the projection axially into the socket prior to engagement of the bearing end of the nut with the support.

11. A nut retainer for mounting a nut on a support with its axis aligned with a bolt hole in the support, said retainer being generally cup-shaped for receiving a nut therein and having oppositely disposed wall portions projecting beyond the bearing end of the nut for frictionally engaging in sockets of the support when the retainer is thrust axially toward the support, and means for locking a bolt and the nut in clamping relation to the support comprising means on the retainer frictionally embracing the nut and resisting axial movement of the nut in the retainer, and shoulders on said projections limiting movement of the retainer in direction toward the support so that said bearing end of the nut is spaced away from the support, whereby a bolt threaded into the nut must overcome said frictional resistance to movement of the nut in the retainer in drawing the nut into engagement with the support.

12. A nut retainer for mounting a nut on a support with its axis aligned with a bolt hole in the support, said retainer being generally cup-shaped with cross-sectional contour generally corresponding to the cross-sectional contour of the nut, for receiving a nut therein, and having its side walls slitted to provide wall portions resiliently embracing the flats of the nut, oppositely disposed wall portions extending beyond the bearing end of the nut in said retainer and having terminals slitted longitudinally to provide terminal parts on opposite sides of a slit resiliently movable toward each other edgewise, and cam surfaces on said terminal parts for engaging socket walls in the support to effect the resilient edgewise movement of the terminal parts to produce frictional gripping of the terminals with the socket walls when the retainer is thrust axially toward the support, and means on each terminal part limiting its movement into a socket.

HENRY A. TAYLOR.